United States Patent
Oishi (10) Patent No.: US 9,822,864 B2
(45) Date of Patent: Nov. 21, 2017

(54) STRAIN WAVE GEARING APPARATUS

(71) Applicant: SANKYO SEISAKUSHO CO., Tokyo (JP)

(72) Inventor: Atsushi Oishi, Shizuoka (JP)

(73) Assignee: SANKYO SEISAKUSHO CO., Tokyo (JP)

( * ) Notice: Subject to any disclaimer, the term of this patent is extended or adjusted under 35 U.S.C. 154(b) by 121 days.

(21) Appl. No.: 14/773,607

(22) PCT Filed: Mar. 25, 2014

(86) PCT No.: PCT/JP2014/001696
§ 371 (c)(1),
(2) Date: Sep. 8, 2015

(87) PCT Pub. No.: WO2014/156118
PCT Pub. Date: Oct. 2, 2014

(65) Prior Publication Data
US 2016/0061308 A1    Mar. 3, 2016

(30) Foreign Application Priority Data
Mar. 27, 2013 (JP) .................................. 2013-065367

(51) Int. Cl.
*F16H 35/00* (2006.01)
*F16H 49/00* (2006.01)
*F16H 57/12* (2006.01)

(52) U.S. Cl.
CPC ..... *F16H 49/001* (2013.01); *F16H 2049/003* (2013.01); *F16H 2049/006* (2013.01); *F16H 2057/126* (2013.01)

(58) Field of Classification Search
CPC .................................................. F16H 49/001
(Continued)

(56) References Cited

U.S. PATENT DOCUMENTS 5,937,710 A *   8/1999  Gould ................... F16H 35/008
                                                                74/640
6,269,711 B1 *  8/2001  Tejima .................. F16H 49/001
                                                                384/512
(Continued)

FOREIGN PATENT DOCUMENTS

JP        H02-221740 A    9/1990
JP        H05-141486 A    6/1993
(Continued)

OTHER PUBLICATIONS

Jun. 10, 2014 International Search Report issued in International Patent Application No. PCT/JP2014/001696.
(Continued)

*Primary Examiner* — Ha D Ho
(74) *Attorney, Agent, or Firm* — Oliff PLC (57) ABSTRACT

Provided is a strain wave gearing apparatus which is able to make the most of the structural advantages of the flat form while achieving ideal mesh-engagement without involving a high degree of dimensional precision or any special adjustment mechanism. A strain wave gearing apparatus is provided with a stationary internal gear, a rotary internal gear disposed side by side with the stationary internal gear, a flexible planetary gear disposed on the inner peripheral side thereof for meshing partially with the internal gears by being deflected in the radial direction, and a wave generator disposed inside the flexible planetary gear for continuously deforming and deflecting the flexible planetary gear by rotation. In the apparatus, backlash during mesh-engagement is eliminated by making the base portions and of the internal gears and elastic.

10 Claims, 7 Drawing Sheets

(58) Field of Classification Search
USPC .......................................................... 74/640
See application file for complete search history.

(56) References Cited

U.S. PATENT DOCUMENTS

| | | | | |
|---|---|---|---|---|
| 8,485,064 B2* | 7/2013 | Kanai | ................... | F16H 49/001 |
| | | | | 74/640 |
| 2005/0288143 A1* | 12/2005 | Menjak | .................. | B62D 5/008 |
| | | | | 475/29 |
| 2009/0320643 A1 | 12/2009 | Kanai | | |

FOREIGN PATENT DOCUMENTS

| | | |
|---|---|---|
| JP | 2009-156462 A | 7/2009 |
| JP | 2010-007757 A | 1/2010 |
| JP | 2012-167770 A | 9/2012 |

OTHER PUBLICATIONS

Jun. 10, 2014 Written Opinion issued in International Patent Application No. PCT/JP2014/001696.
Jan. 4, 2017 Office Action issued in Chinese Patent Application No. 201480016375.5.

* cited by examiner

(2) STATIONARY INTERNAL GEAR (1) ROTARY INTERNAL GEAR

Fig. 9

STRAIN WAVE GEARING APPARATUS

TECHNICAL FIELD

The present invention relates to a strain wave gearing apparatus and, in particular, to a strain wave gearing apparatus suitable for a so-called flat type structure.

BACKGROUND ART

An existing flat type strain wave gearing apparatus is equipped with a rigid first internal gear, a rigid second internal gear arranged side by side with the first internal gear, a flexible planetary gear arranged on the inner peripheral side of the first and second internal gears and deflected in the radial direction so that a swollen portion thereof is brought into mesh with the first and second internal gears, and a wave generator fitted into the flexible planetary gear and configured to deflect the flexible planetary gear. In this flat type strain wave gearing apparatus, when the wave generator rotates, an ellipsis drawn by the flexible planetary gear continuously varies due to a cam action; utilizing this, the partial mesh-engagement position of the internal gear and the flexible planetary gear is moved in the circumferential direction, whereby there is generated a relative rotation between both internal gears in accordance with the difference in number of teeth between the first internal gear and the second internal gear.

In this flat type structure, the overall configuration is compact, and the flexible planetary gear is of a simple cylindrical configuration, so that no excessive stress is applied during rotation, making it advantageously possible to maintain a sufficient configuration retainability while maintaining flexibility.

CITATION LIST

Patent Literature

Japanese Laid-Open Patent Disclosure 1: JP-A-hei 2-221740
Japanese Laid-Open Patent Disclosure 2: JP-A-2009-156462

SUMMARY OF INVENTION

Technical Problem

In terms of operational principle, the strain wave gearing apparatus requires no backlash for the mesh-engagement between the gears; when used in a robot arm or the like, it is necessary to enhance the stopping accuracy, so that there is a demand for realizing a non-backlash mesh-engagement.

To meet this demand, regarding a cup-shaped strain wave gearing apparatus, there has been made a proposal according to which a non-backlash mesh-engagement is realized by imparting a pre-load through utilization of the cup-shaped configuration thereof.

On the other hand, in the flat-type structure, due to the above-mentioned structural features, the flexible planetary gear is cylindrical, so that such a pre-load as in the case of the cup-shaped structure is not to be expected.

The Disclosure 1 proposes the formation of a large deflected portion through enhancement of the degree of ellipticity of the flexible planetary gear to realize a non-backlash mesh-engagement by realizing the pre-load of this deflected portion. In this proposal, however, a large deflected portion is forcibly formed, so that when an abrupt fluctuation in torque is generated, jumping is likely to occur. Further, this structure is obviously inferior to the cup-shaped one also in terms of the backlash improving effect.

The Disclosure 2 proposes, in contrast to the flat type structure, the realization of a non-backlash mesh-engagement through enhancement of the tooth shape precision. This proposal, however, is not realistic since it involves an excessive burden in terms of the gear manufacturing.

The present invention has been made in view of the above problems in the prior art; it is an object of the present invention to provide a novel and useful strain wave gearing apparatus which can utilize the advantage in shape of the flat type apparatus as it is and which can realize an ideal non-backlash mesh-engagement without involving high dimensional precision or any special adjustment mechanism.

Solution to Problem

The present inventor has found out that, by making the base portion of an internal gear elastic, the internal gear elastically receives an external gear to realize an ideal non-backlash mesh-engagement between the two gears, and that it is possible to prevent permanent deformation of the internal gear through mitigation of the wear thereof, making it possible to chronologically secure the above-mentioned non-backlash mesh-engagement, thus completing the present invention.

According to a first aspect of the present invention, there is provided a strain wave gearing apparatus including; a first internal gear, a second internal gear arranged side by side with the first internal gear, a flexible planetary gear arranged on the inner peripheral side of the first and second internal gears and deflected in the radial direction to be partially brought into mesh with the first and second internal gears, and a wave generator arranged on the inner side of the flexible planetary gear and configured to deflect the flexible planetary gear while continuously deforming the same through rotation, with a relative rotation being generated between the first internal gear and the second internal gear in accordance with a difference in number of teeth therebetween, wherein the first internal gear has an elastic base portion on the inner side of which is formed an inner teeth, and a rigid mounting portion connected to the base portion in a cantilever-like fashion, the second internal gear has an elastic base portion on the inner side of which is formed an inner teeth, and a rigid mounting portion connected to the base portion in a cantilever-like fashion, and the relative movement in the axial direction of the first and second internal gears with respect to the flexible planetary gear is constrained.

According to a second aspect of the invention, there is provided a strain wave gearing apparatus in the first aspect, wherein the first and second internal gears are formed by thin-walled members.

According to a third aspect of the invention, there is provided a strain wave gearing apparatus in the second aspect, wherein a back-up ring is arranged on the outer peripheral side of the first and second internal gears.

According to a fourth aspect of the invention, there is provided a strain wave gearing apparatus in the second or third aspect, wherein the first and second internal gears consist of conical gears, and the flexible planetary gear consists of a biconical gear; and both tapered surface sides of the flexible planetary gear are respectively held by the internal gear sides to constrain relative movement in the axial direction.

According to a fifth aspect of the invention, there is provided a strain wave gearing apparatus in one of the first to fourth aspects, wherein the wave generator has three or more mesh-engagement correspondence protrusions protruding outwardly to bring the first and second internal gears into mesh with the flexible planetary gear.

Advantageous Effects of Invention

In the strain wave gearing apparatus of the present invention, it is possible to utilize the merit in shape of the flat type structure, and to realize an ideal non-backlash mesh-engagement without involving high dimensional precision and any special adjustment mechanism.

DESCRIPTION OF EMBODIMENTS

A strain wave gearing apparatus 1 according to the first embodiment of the present invention will be described with reference to the drawings.

Figure 1:
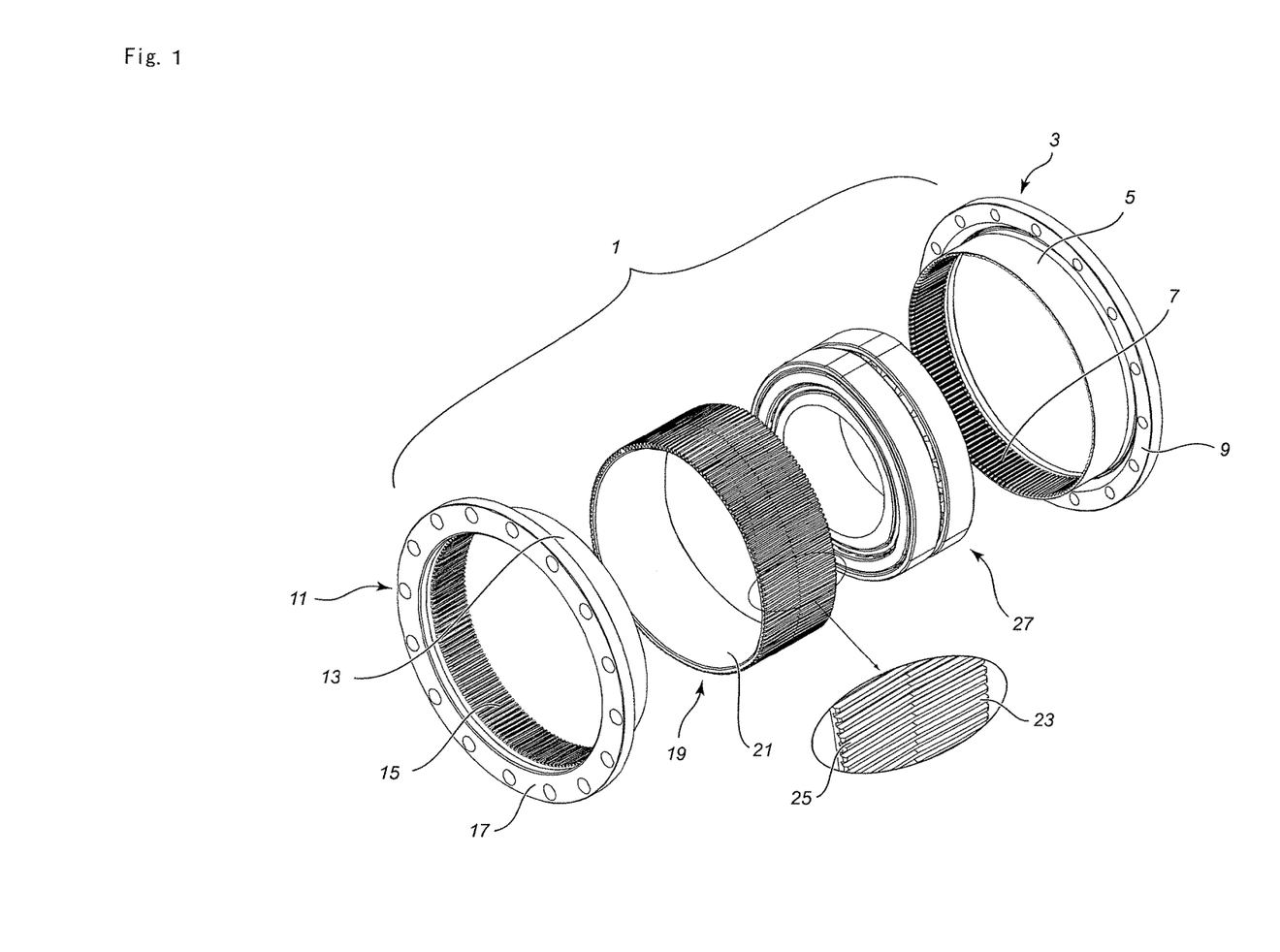
FIG. 1 is an exploded perspective view of a flat type strain wave gearing apparatus according to a first embodiment of the present invention.

As shown in FIG. 1, this strain wave gearing apparatus 1 is equipped with a stationary internal gear 3, a rotary internal gear 11, a flexible planetary gear 19, and a wave generator 27; all of these components are formed of a metal material.

A base portion 5 of the stationary internal gear 3 is generally substantially cylindrical; its contour on the inner peripheral side is formed so as to be conical in sectional view; and inner teeth 7 are formed on the tapered surface on the inner peripheral side thereof to constitute a conical internal gear. The base portion 5 is thin-walled, and the base portion 5 as a whole is elastic. A rigid mounting portion 9 is mounted to the divergent side end portion of the base portion 5.

The rotary internal gear 11 also has a base portion 13, inner teeth 15, and a mounting portion 17 formed in the same manner as those of the stationary internal gear 3.

However, the number of teeth of the rotary internal gear 11 is smaller than that of the stationary internal gear 3 by three (minus three). The base portions 5 and 13 of the internal gears 3 and 11 are substantially of the same configuration, so that the above difference in the number of teeth is realized through difference in tooth width and tooth length.

A base portion 21 of the flexible planetary gear 19 is substantially cylindrical as a whole; however, its outer peripheral side contour is formed so as to be biconical in sectional view, and outer teeth 23 and 25 are formed on the outer peripheral tapered surface of the base portion 21 to constitute a biconical gear. The flexible planetary gear 19 is thin-walled, and elastic as a whole, and is configured to be deflected in conformity with pressure from the inner and outer peripheral sides.

Figure 2:
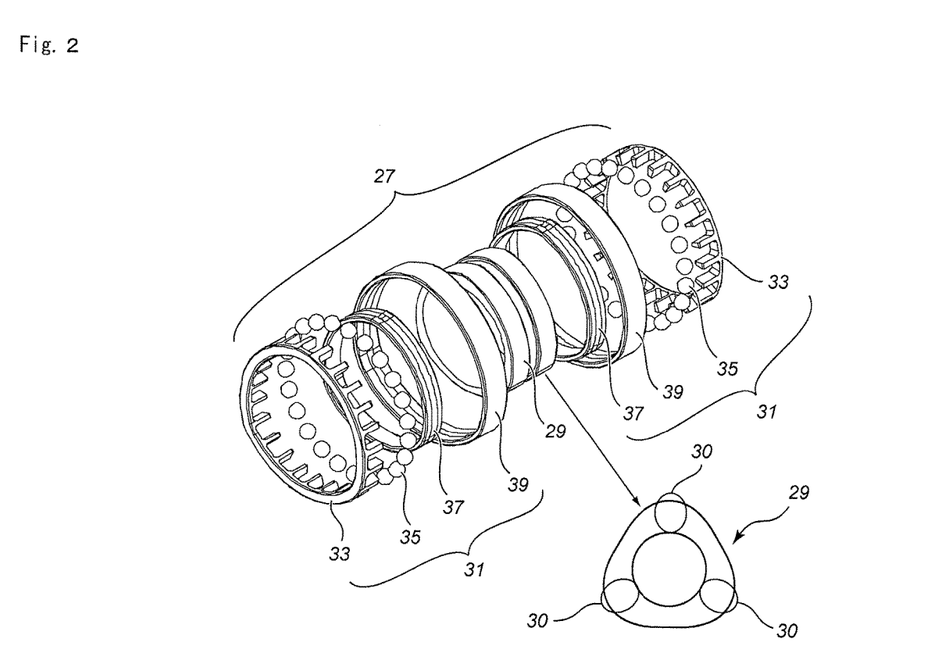
FIG. 2 is an exploded perspective view of a wave generator of FIG. 1.

As shown in FIG. 2, the wave generator 27 is equipped with a cam portion 29 of a substantially triangular outer contour, and a strain wave bearing 31 fitted onto the cam portion 29, with the hollow portion of the cam portion 29 constituting a connecting portion for the rotation shaft (not shown) of a motor. The strain wave bearing 31 has a plurality of balls 35 retained by a retainer 33, an inner ring 37, and an outer ring 39. The inner ring 37 is fixed to the outer periphery of the cam portion 29, and the outer ring 39 is fit-engaged with the inner peripheral side of the flexible planetary gear 19.

Figure 3:
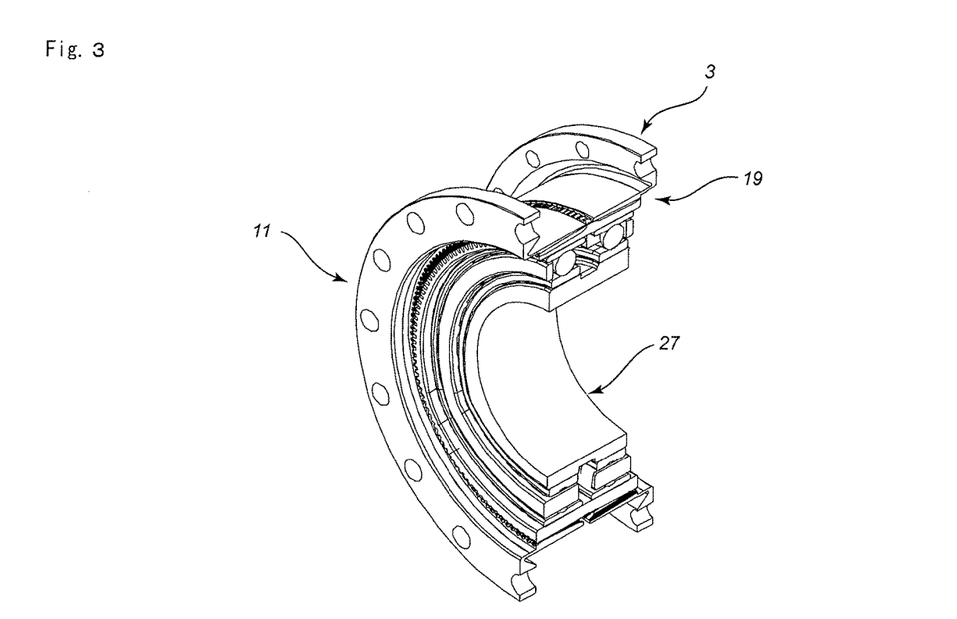
FIG. 3 is a perspective view, partly in section, of the (assembled) strain wave gearing apparatus of FIG. 1.

The strain wave gearing apparatus 1 is formed through the combination of the above members; as shown in FIG. 3, the stationary internal gear 3 and the rotary internal gear 11 are arranged side by side, and the flexible planetary gear 19 is arranged on the inner peripheral side thereof; the inner teeth 7 of the stationary internal gear 3 are in mesh with the outer teeth 23 of the flexible planetary gear 19, and the inner teeth 15 of the rotary internal gear 11 are in mesh with the outer teeth 25 of the flexible planetary gear 19. The wave generator 27 is fitted into the flexible planetary gear 19.

The cam portion 29 of the wave generator 27 is substantially of a triangular outer peripheral contour and has three apex portions 30 constituting mesh-engagement correspondence protrusions 30, so that the flexible planetary gear 19 greatly protrudes radially outwards at the three portions, with the corresponding portions 30C being in mesh with the internal gears 3 and 11.

Figure 4:
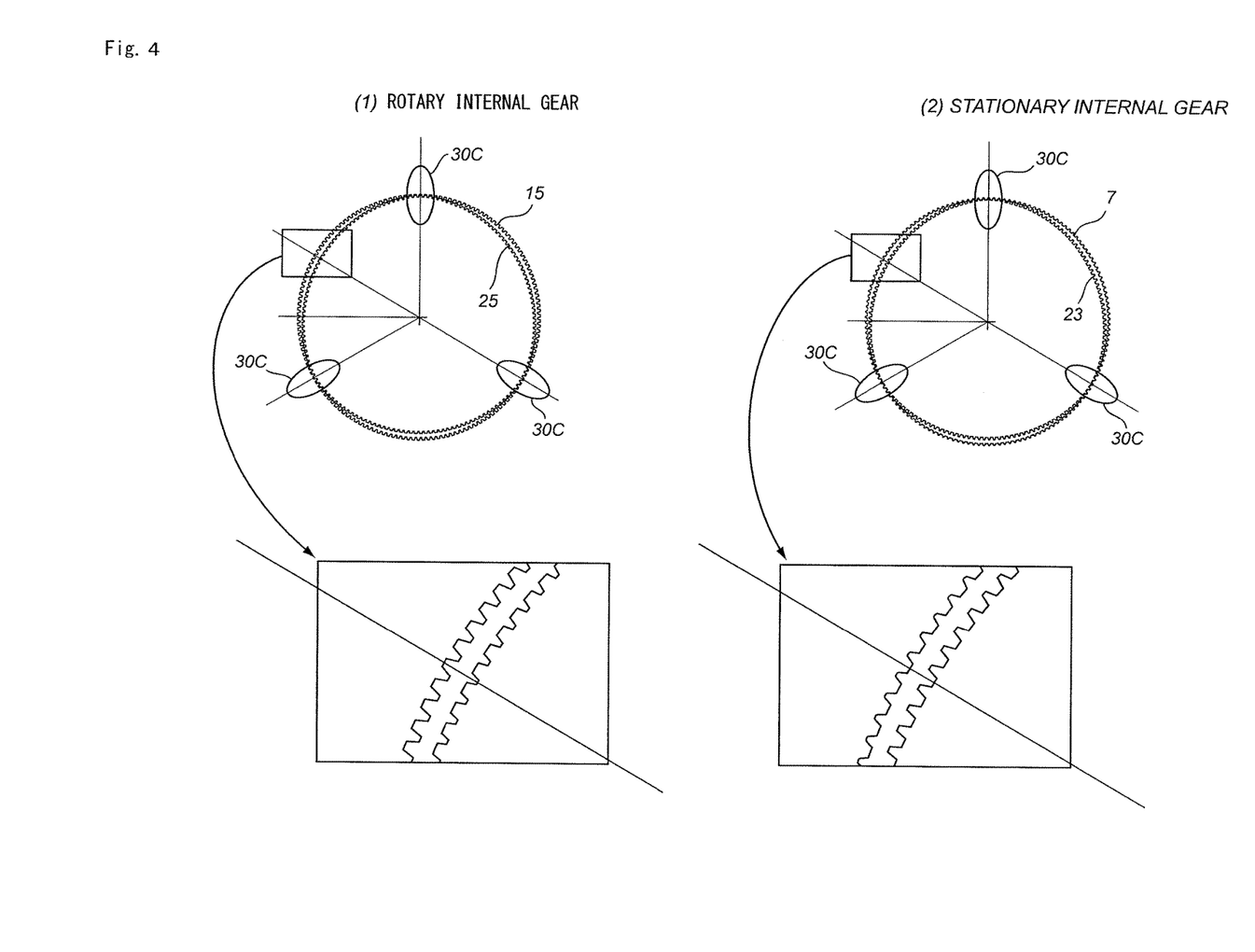
FIG. 4 is an explanatory view of the mesh-engagement state of the strain wave gearing apparatus of FIG. 3.

In the stationary internal gear 3, the base portion 5 with the inner teeth 7 is, so to speak, connected to the rigid mounting portion 9 in a cantilever-like fashion; since the entire base portion 5 is elastic, the deflection of the outwardly protruding portions of the flexible planetary gear side are elastically absorbed at the mesh-engagement portions, thereby eliminating backlash. The rotary internal gear 11 side also provides a similar action.

Figure 5:
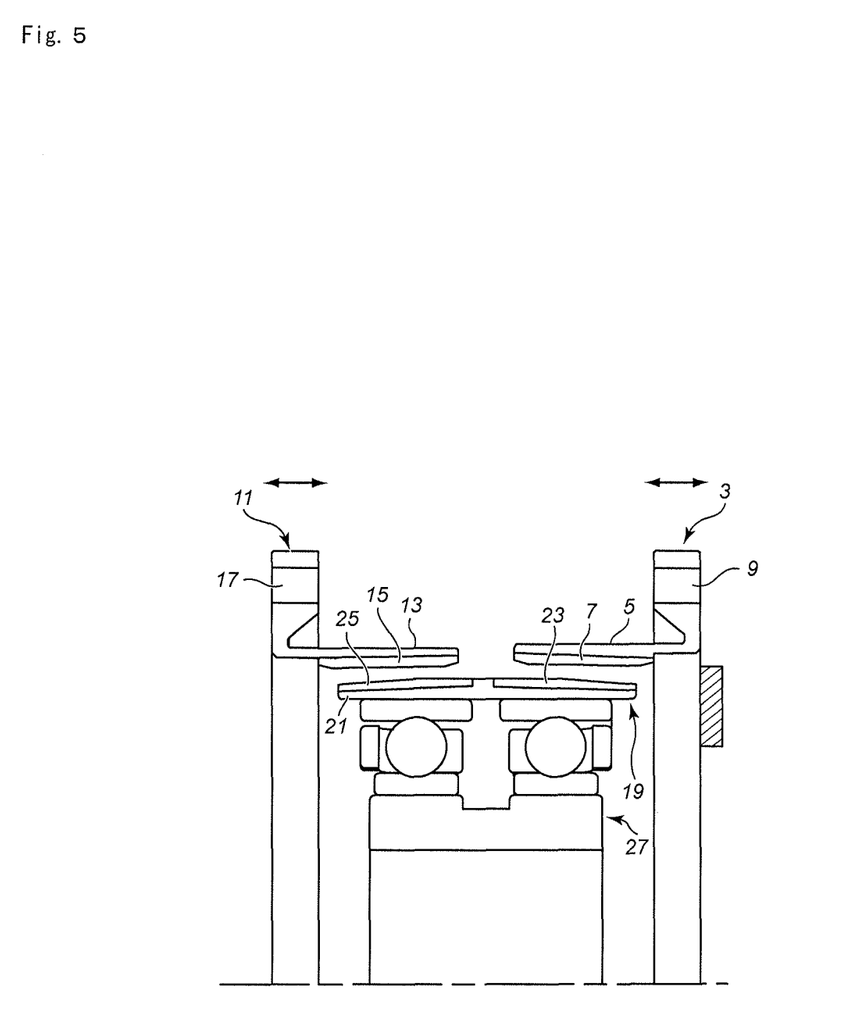
FIG. 5 is a sectional view for illustrating the axial movement adjustment function of strain wave gearing apparatus of FIG. 3.

As shown in FIG. 5, the base portions 5 and 13 of the internal gears 3 and 11 are deflectable; with the convergent sides of the tapered surfaces of the base portions 5 and 13 being opposite each other, they are arranged on the outer side of the biconical tapered surface of the flexible planetary gear 19. Thus, the stationary internal gear 3 and the rotary internal gear 11 are respectively movable in the axial direction indicated by arrows (=the tooth-line direction) with respect to the flexible planetary gear 19.

In the strain wave gearing apparatus 1, by utilizing the above described features in configuration, the stationary internal gear 3 and the rotary internal gear 11 are brought sufficiently close to each other from both axial ends, whereby it is possible to constrain relative axial displacement, with the gap being minimized.

Figure 6:
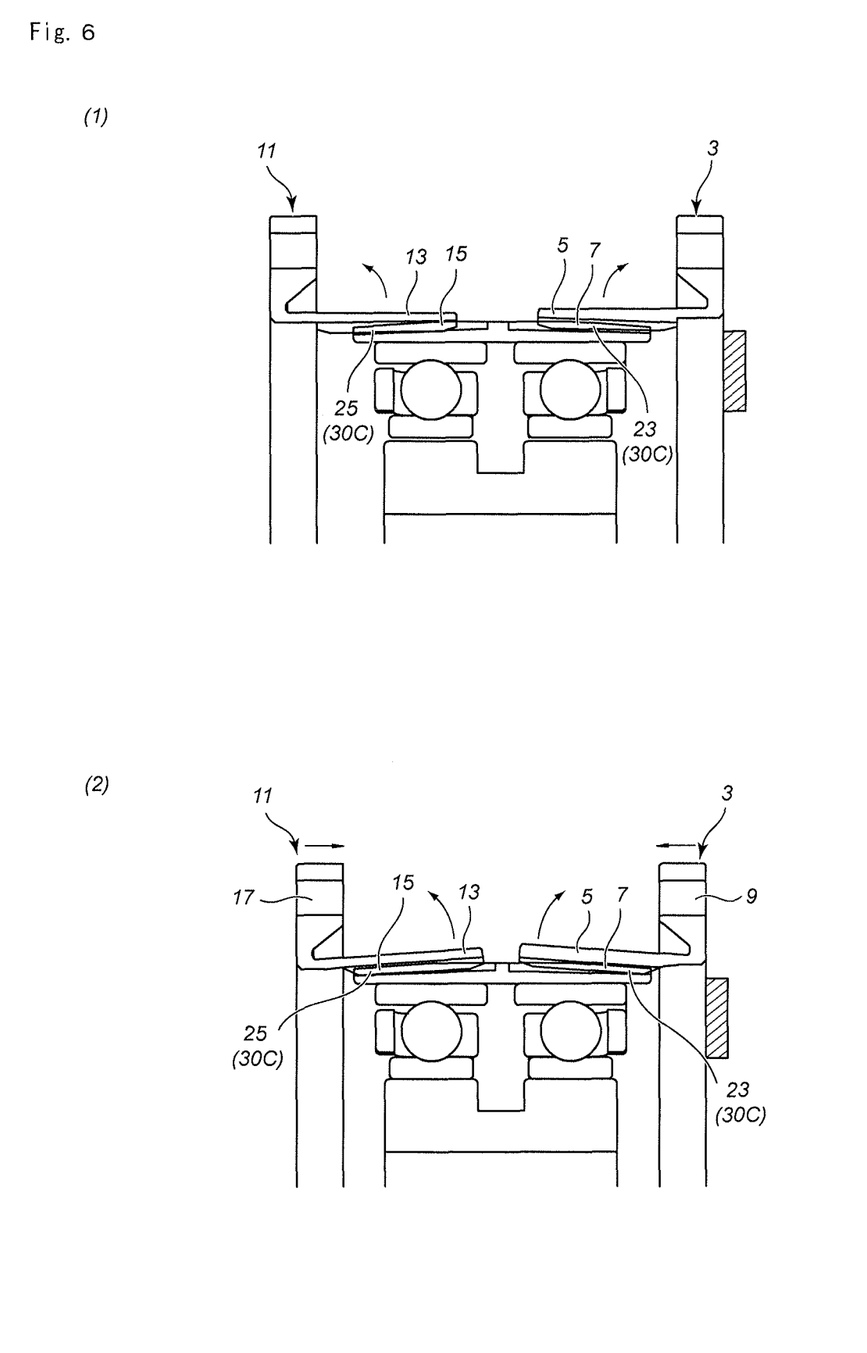
FIG. 6 is a sectional view for illustrating the mesh-engagement state after axial movement.

FIG. 6(1) shows the mesh-engagement state prior to the movement; in this case, the conical effect cannot be utilized to the utmost, and the pre-load is small, with the deflection amount being so much the smaller.

FIG. 6(2) shows the mesh-engagement state after the movement; under this constraint state, when the flexible planetary gear 19 rotates, and the swollen correspondence portion 30C comes around, the stationary internal gear 3 and the rotary internal gear 11, which have the elastic base portions 5 and 13, are deflected as indicated by the arrows, making it possible to apply a pre-load to the mesh-engagement portions between themselves and the outer teeth 23 of the flexible planetary gear 19. The magnitude of the pre-load can be optimized through adjustment of the axial movement amount. This pre-load helps to further diminish backlash.

Transition in the mesh-engagement in this strain wave gearing apparatus 1 will be described with reference to FIG. 7.

When the wave generator 27 rotates, due to the strain wave cam action, the balls 35 of the flexible planetary gear 19 revolve along the stationary internal gear 3 while rotating, and, while continuously deforming the flexible planetary gear 19, the mesh-engagement position between the stationary internal gear 3 and the flexible planetary gear 19, and the mesh-engagement position between the rotary internal gear 11 and the flexible planetary gear 19, are moved in the circumferential direction. Thus, the flexible planetary gear 19 functions as a reverse idler shaft, and relative rotation is generated in accordance with the difference in the number of teeth, with decelerated rotation being output to the rotary internal gear 11 side.

Figure 7:
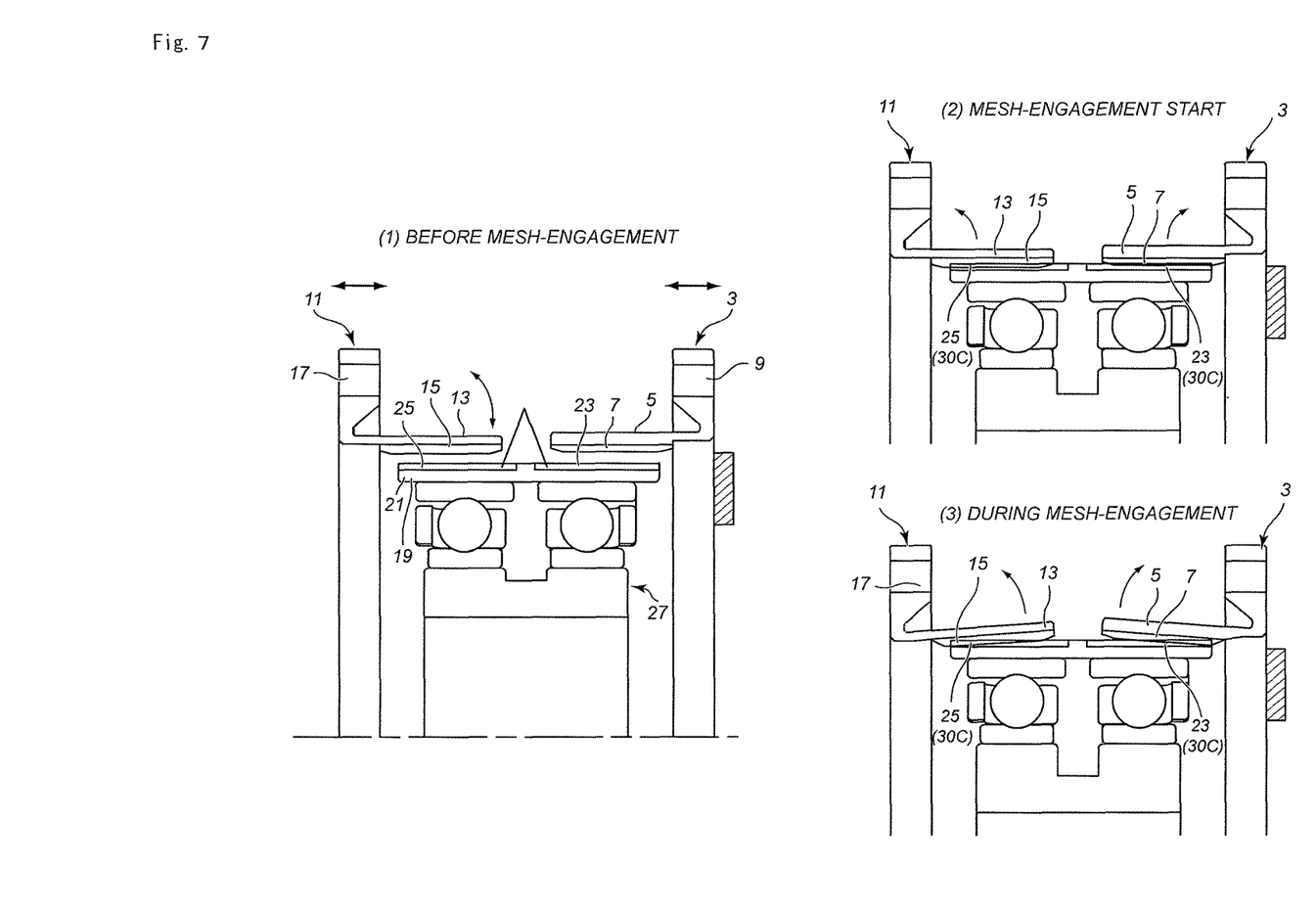
FIG. 7 is a mesh-engagement transition diagram of the strain wave gearing apparatus of FIG. 3.

In FIG. 7(1), neither the stationary internal gear 3 nor the rotary internal gear 11 is in mesh with the flexible planetary gear 19; in FIG. 7(2), mesh-engagement is started; and, in FIG. 7(3), the mesh-engagement is effected most strongly.

In FIG. 7(2), the base portion 5 of the stationary internal gear 3 and the base portion 13 of the rotary internal gear 11 begin to be deflected; they are further deflected in FIG. 7(3).

In this way, in the strain wave gearing apparatus 1, not only due to the elastic effect of the base portions 5 and 13 of the stationary internal gear 3 and the rotary internal gear 11, but also due to the pre-load imparting effect, there is realized an ideal non-backlash mesh-engagement.

Further, in this strain wave gearing apparatus 1, the inner configuration of the internal gears 3 and 11 is conical, and the outer configuration of the flexible planetary gear 19 is conical, so that the mesh-engagement is effected through point contact; however, since both the base portions 5 and 13 are elastic, the point contact area is larger as compared with the case where one of them is rigid. Further, the flexible planetary gear 19 protrudes in a triangular form to be mesh-engaged with the internal gears 3 and 11 at three portions.

Thus, the rigidity and the permissible torque are enhanced.

A strain wave gearing apparatus 41 according to the second embodiment of the present invention will be described with reference to the drawings.

Figure 8:
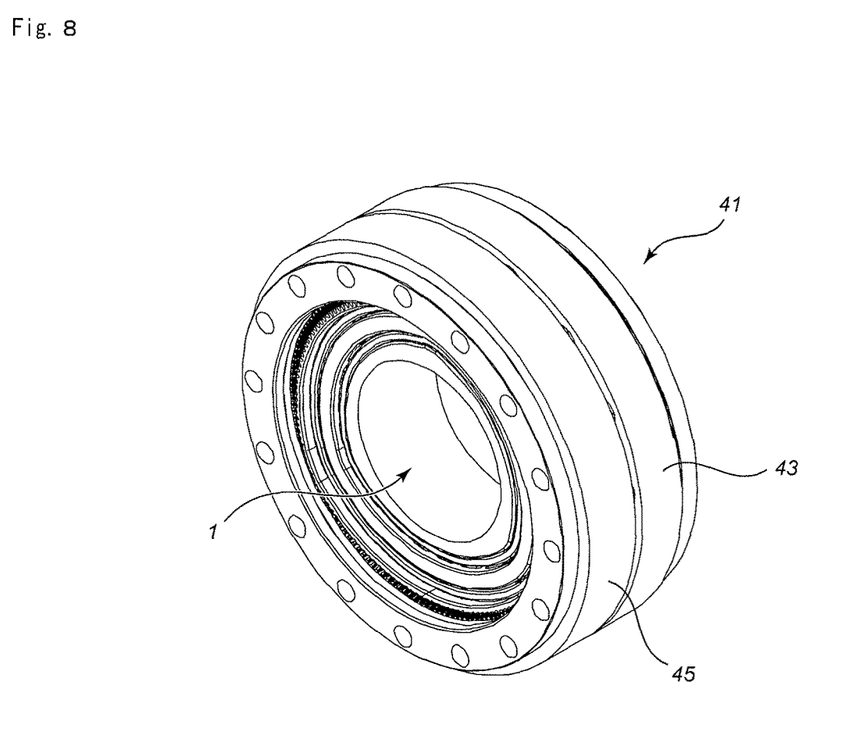
FIG. 8 is a perspective view of an (assembled) strain wave gearing apparatus according to a second embodiment of the present invention.
Figure 9:
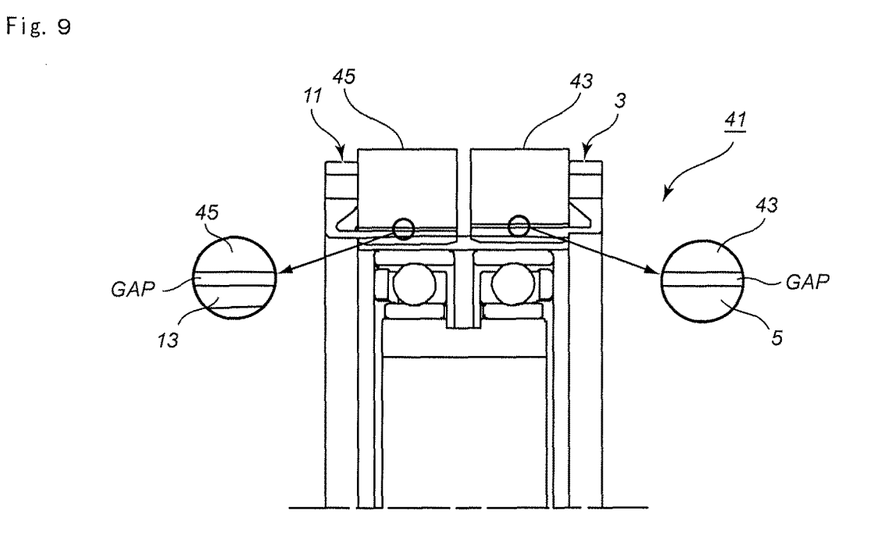
FIG. 9 is a sectional view of the strain wave gearing apparatus of FIG. 8.

As shown in FIGS. 8 and 9, annular back-up rings 43 and 45 are added to the strain wave apparatus 1. One axial end of the back-up ring 43 is connected to the mounting portion 9 of the stationary internal gear 3, and it surrounds the base portion 5 from the outer peripheral side with a slight gap therebetween; and one axial end of the back-up ring 45 is connected to the mounting portion 17 of the rotary internal gear 11, and it surrounds the base portion 13 from the outer peripheral side with a slight gap therebetween.

Due to the provision of the back-up rings 43 and 45, it is possible to prevent excessive radial swelling of the base portions 5 and 13 of the internal gears 3 and 11, making it possible to perform backlash control in a stable manner.

As a result, even when an excessive torque is generated, it is possible to prevent jumping and breakage.

The specific constructions of the embodiments of the present invention described in detail above should not be construed restrictively; any change in design without departing from the gist of the present invention should be included in the scope of the invention.

That is, so long as the features in terms of configuration, physical features, etc. as claimed in the claims are satisfied, addition of the features in configuration of other portions, whether existing or to be devised in the future, and arbitrary selection of materials, are to be included in the scope of the present invention.

For example, instead of the balls, the strain wave bearing may employ runners.

Further, in the flexible planetary gear, it is possible to change the number of mesh-engagement portions through a change in the configuration of the cam portion, so that the number may be set to an arbitrary number of two or more according to use.

Further, there is no technical necessity for the two gears of the biconical gear to be of the same tapered configuration or of the same gear design; further, the bottom surfaces of the two cones may not directly face each other but through the intermediation of a spacer.

REFERENCE SIGNS LIST

1 . . . strain wave gearing apparatus (first embodiment), 3 . . . stationary internal gear, 5 . . . base portion, 7 . . . inner teeth, 9 . . . mounting portion, 11 . . . rotary internal gear, 13 . . . base portion, 15 . . . inner teeth, 17 . . . mounting portion, 19 . . . flexible planetary gear, 21 . . . base portion, 23, 25 . . . outer teeth, 27 . . . wave generator, 29 . . . cam portion, 30 . . . mesh-engagement correspondence protrusion, 31 . . . strain wave bearing, 33 . . . retainer, 35 . . . ball, 37 . . . inner ring, 39 . . . outer ring, 41 . . . strain wave gearing apparatus (second embodiment), 43, 45 . . . back-up ring.

The invention claimed is:

1. A strain wave gearing apparatus comprising; a first internal gear, a second internal gear arranged side by side with the first internal gear, a flexible planetary gear arranged on the inner peripheral side of the first and second internal gears and deflected in the radial direction to be partially brought into mesh with the first and second internal gears, and a wave generator arranged on the inner side of the flexible planetary gear and configured to deflect the flexible planetary gear while continuously deforming the flexible planetary gear through rotation, with a relative rotation being generated between the first internal gear and the second internal gear in accordance with a difference in number of teeth therebetween, wherein the first internal gear has an elastic base portion on the inner side of which is formed an inner teeth, and a rigid mounting portion connected to the base portion in a cantilever-like fashion, the second internal gear has an elastic base portion on the inner side of which is formed an inner teeth, and a rigid mounting portion connected to the base portion in a cantilever-like fashion, and the relative movement in the axial direction of the first and second internal gears with respect to the flexible planetary gear is constrained.

2. The strain wave gearing apparatus according to claim 1, wherein the first and second internal gears are formed by thin-walled members.

3. The strain wave gearing apparatus according to claim 2, wherein a back-up ring is arranged on the outer peripheral side of the first and second internal gears.

4. The strain wave gearing apparatus according to claim 2, wherein the first and second internal gears consist of conical gears, and the flexible planetary gear consists of a biconical gear; and both tapered surface sides of the flexible planetary gear are respectively held by internal gear sides to constrain relative movement in the axial direction.

5. The strain wave gearing apparatus according to claim 1, wherein the wave generator has three or more mesh-engagement correspondence protrusions protruding outwardly to bring the first and second internal gears into mesh with the flexible planetary gear.

6. The strain wave gearing apparatus according to claim 3, wherein the first and second internal gears consist of conical gears, and the flexible planetary gear consists of a biconical gear; and both tapered surface sides of the flexible planetary gear are respectively held by internal gear sides to constrain relative movement in the axial direction.

7. The strain wave gearing apparatus according to claim 2, wherein the wave generator has three or more mesh-engagement correspondence protrusions protruding outwardly to bring the first and second internal gears into mesh with the flexible planetary gear.

8. The strain wave gearing apparatus according to claim 3, wherein the wave generator has three or more mesh-engagement correspondence protrusions protruding outwardly to bring the first and second internal gears into mesh with the flexible planetary gear.

9. The strain wave gearing apparatus according to claim 4, wherein the wave generator has three or more mesh-engagement correspondence protrusions protruding outwardly to bring the first and second internal gears into mesh with the flexible planetary gear.

10. The strain wave gearing apparatus according to claim 6, wherein the wave generator has three or more mesh-engagement correspondence protrusions protruding outwardly to bring the first and second internal gears into mesh with the flexible planetary gear.

* * * * *